W. A. LOVELAND.
REED-ORGAN.
No. 173,127. Patented Feb. 8, 1876.
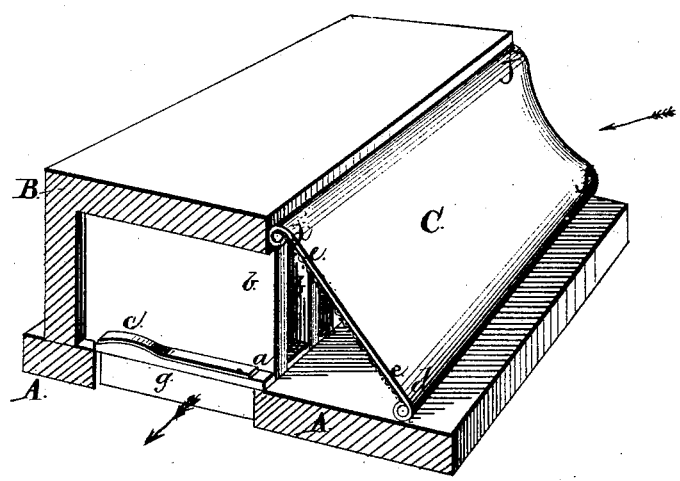

UNITED STATES PATENT OFFICE.

WILLIAM A. LOVELAND, OF PLYMOUTH, MASSACHUSETTS.

IMPROVEMENT IN REED-ORGANS.

Specification forming part of Letters Patent No. 173,127, dated February 8, 1876; application filed November 1, 1875.

*To all whom it may concern:*

Be it known that I, WILLIAM A. LOVELAND, of Plymouth, in the county of Plymouth and the State of Massachusets, have invented a new and useful Improvement in Reed-Organs, which improvement is fully set forth in the following specification, reference being had to the accompanying drawing.

It is the almost universal method in producing the necessary pressure and current of air in reed-organs and melodeons to employ an exhaust or suction bellows, by which the air is drawn from the outside through the reed-frame into the bellows.

Air inside an organ-case is profusely and continuously charged with dust of various kinds, and the opening and shutting of valves, stops, swells, &c., in close proximity to the vibrators exposes them to the constant liability of having their motions and sounds impaired and stopped by inhaling dusty air. To prevent this annoyance I have invented an air-filter, to be attached to the reed-board or other adjacent fixture, in such a manner that the air must pass through it and become purified from injurious dust before reaching and acting upon the vibrators. This may be more particularly described by reference to the drawing.

Figure 1 represents a general view of the necessary details in a section of the reed-board of a melodeon or reed-organ.

A A is a lower plate or bed, on which the reeds *a a* rest. B is an upper board or fixture, in which are cavities or cells *b b*, at the bottom of which, and between the two boards, the reeds are closely wedged. An aperture, *g*, leads from each cell down through the plate A into the bellows. C is an air filter or screen, of wire-gauze *d d* or cloth, both of which are shown, and of which *e e* is a section extending over and across the space in front of the reed-cells, fitting closely to its bearings along the lines. Through this air-filter the air must pass, as shown by the direction of the arrows, before it can act upon the vibrators *c*. The air-filter consists of metal gauze *g g*, or its equivalent in other material serving the identical purpose intended, which, for convenience in detaching and replacing, should be supported by a frame, *f f*, of metal or wood, on which it may be fitted as a lining or covering. The edges of the filter may be bound with soft cloth, so as to fit them closely to their bearings, and prevent their vibrating, and the whole may be fastened by buttons or clamps to the reed-boards A and B.

I am aware that wire and other sieves or screens, in connection with organs, are not new; but

What I claim as my invention is—

The frame *f f*, with the gauze *d d*, forming an air filter or screen, C, in combination with the reed-boards A and B, all said parts being arranged relatively to each other substantially as described, and for the purposes set forth.

WILLIAM A. LOVELAND.

Witnesses:
CHAS. RAYMOND,
W. S. ROBBINS.